(12) United States Patent
Nam et al.

(10) Patent No.: US 10,093,074 B2
(45) Date of Patent: Oct. 9, 2018

(54) FLEXIBLE WINDOW AND FLEXIBLE DISPLAY

(71) Applicant: Samsung Display Co., Ltd., Yongin, Gyeonggi-do (KR)

(72) Inventors: Seung Wook Nam, Cheonan-si (KR); Ah Young Kim, Gunpo-si (KR); Yong Cheol Jeong, Yongin-si (KR); Heon Jung Shin, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 135 days.

(21) Appl. No.: 14/723,072

(22) Filed: May 27, 2015

(65) Prior Publication Data

US 2016/0101593 A1    Apr. 14, 2016

(30) Foreign Application Priority Data

Oct. 8, 2014 (KR) .................. 10-2014-0136202

(51) Int. Cl.
*B32B 7/00* (2006.01)
*B32B 7/02* (2006.01)
*B32B 7/12* (2006.01)
*B32B 27/08* (2006.01)
*B32B 27/36* (2006.01)
(Continued)

(52) U.S. Cl.
CPC .................. *B32B 7/02* (2013.01); *B32B 3/00* (2013.01); *B32B 3/04* (2013.01); *B32B 7/00* (2013.01); *B32B 7/12* (2013.01); *B32B 27/00* (2013.01); *B32B 27/06* (2013.01); *B32B 27/08* (2013.01); *B32B 27/28* (2013.01); *B32B 27/281* (2013.01); *B32B 27/30* (2013.01); *B32B 27/308* (2013.01); *B32B 27/36* (2013.01); *B32B 2250/00* (2013.01); *B32B 2250/40* (2013.01); *B32B 2307/50* (2013.01); *B32B 2307/54* (2013.01); *B32B 2307/546* (2013.01); *B32B 2457/20* (2013.01)

(58) Field of Classification Search
CPC ............ B32B 2250/00; B32B 2250/40; B32B 2307/50; B32B 2307/54; B32B 2307/546; B32B 2457/20; B32B 27/00; B32B 27/06; B32B 27/08; B32B 27/28; B32B 27/281; B32B 27/30; B32B 27/308; B32B 27/36; B32B 3/00; B32B 3/04; B32B 7/00
See application file for complete search history.

(56) References Cited

U.S. PATENT DOCUMENTS 3,833,703 A * 9/1974 Joos ........................ B32B 27/00
156/231
5,738,934 A 4/1998 Jones
(Continued)

FOREIGN PATENT DOCUMENTS

| JP | 3894571 B2 | 12/2006 |
|---|---|---|
| KR | 10-2013-0081576 A | 7/2013 |
| KR | 10-2014-0001490 A | 1/2014 |

Primary Examiner — Amber R Orlando
Assistant Examiner — Lawrence Ferguson
(74) Attorney, Agent, or Firm — Lewis Roca Rothgerber Christie LLP

(57) ABSTRACT

A flexible window and flexible display are disclosed. In one aspect, the flexible window includes a first film having a first Young's modulus, a second film positioned over the first film and having a second Young's modulus that is greater than the first Young's modulus, and a first adhesive layer interposed between the first film and the second film.

9 Claims, 8 Drawing Sheets

(51) Int. Cl.
  *B32B 27/28* (2006.01)
  *B32B 27/00* (2006.01)
  *B32B 27/06* (2006.01)
  *B32B 27/30* (2006.01)
  *B32B 3/00* (2006.01)
  *B32B 3/04* (2006.01)

(56) References Cited

U.S. PATENT DOCUMENTS

2006/0132027 A1* 6/2006 Gao .................... H01L 51/0097
                                                    313/506
2007/0202933 A1* 8/2007 Tolbert .............. B32B 17/10018
                                                    455/575.1
2013/0034685 A1   2/2013 An et al.
2013/0100053 A1* 4/2013 Kang ........................ G06F 3/03
                                                    345/173

\* cited by examiner (A)

(B)

FLEXIBLE WINDOW AND FLEXIBLE DISPLAY

INCORPORATION BY REFERENCE TO ANY PRIORITY APPLICATIONS

This application claims priority to and the benefit of Korean Patent Application No. 10-2014-0136202 filed in the Korean Intellectual Property Office on Oct. 8, 2014, the entire contents of which are incorporated herein by reference.

BACKGROUND

Field

The described technology generally relates to a flexible window and a flexible display.

Description of the Related Technology

Representative examples of a flat panel display include an organic light-emitting diode (OLED) display, a liquid crystal display (LCD), a plasma display panel (PDP), and the like.

The standard flat panel display includes a window formed on a display unit which displays images. The window protects the display unit from the environment.

Recently, flexible display units which are sufficiently flexible to attain a small curvature radius of about 2 mm to about 5 mm have been undergoing research and development. Such flexible display units can include a flexible, stretchable, foldable, bendable, or rollable OLED display.

Accordingly, a flexible window that can protect such a flexible display unit while having a flexibility corresponding to the flexibility of the flexible display unit has been required.

The above information disclosed in this Background section is only intended to facilitate the understanding of the background of the described technology and therefore it may contain information that does not form the prior art that is already known in this country to a person of ordinary skill in the art.

SUMMARY OF CERTAIN INVENTIVE ASPECTS

One inventive aspect is a flexible window formed with a plurality of films and a flexible display including the same.

Another aspect is a flexible window protecting the flexible display unit realizing the small curvature radius and having a flexibility corresponding to the flexibility of the flexible display unit and a flexible display including the same.

Another aspect is a flexible window including: a first film having a first Young's modulus; a second film positioned on the first film and having a second Young's modulus that is greater than the first Young's modulus; and a first adhesive layer positioned between the first film and the second film.

The second film may have a thickness that is less than that of the first film.

A third film positioned on the second film and having a third Young's modulus that is greater than the second Young's modulus and a second adhesive layer positioned between the second film and the third film may be included.

The third film may have the thickness that is less than that of the second film.

Another aspect is a flexible display including: a flexible display unit; and a flexible window including a first film having a first Young's modulus, a second film positioned on the first film and having a second Young's modulus that is greater than the first Young's modulus, and a first adhesive layer positioned between the first film and the second film.

The flexible display unit may include a bending area and a non-bending area adjacent to the bending area.

The flexible display may be bent at a side of the flexible display unit.

One portion of the second film overlapping the bending area may have a thickness that is less than that of the first film and a remaining portion of the second film overlapping the non-bending area may have a thickness that is greater than that of the first film.

The one portion and the remaining portion of the second film may be integrally formed.

One portion of the first film overlapping the bending area may have a thickness that is great than that of the second film and a remaining portion of the first film overlapping the non-bending area may have a thickness that is less than that of the second film.

The flexible window may include a third film positioned on the second film and having a third Young's modulus that is greater than the second Young's modulus and a second adhesive layer positioned between the second film and the third film.

One portion of the third film overlapping the bending area may have a thickness that is less than that of the second film and a remaining portion of the third film overlapping the non-bending area may have a thickness that is greater than that of the second film.

Another aspect is a flexible window comprising a first film having a first Young's modulus; a second film positioned over the first film and having a second Young's modulus that is greater than the first Young's modulus; and a first adhesive layer interposed between the first film and the second film.

In exemplary embodiments, the second film has a thickness that is less than that of the first film. The flexible window can further comprise a third film positioned over the second film and having a third Young's modulus that is greater than the second Young's modulus; and a second adhesive layer interposed between the second film and the third film. The third film can have a thickness that is less than that of the second film.

Another aspect is a flexible display comprising a flexible display unit; and a flexible window formed over the flexible display unit and comprising: a first film having a first Young's modulus; a second film positioned over the first film and having a second Young's modulus that is greater than the first Young's modulus; and a first adhesive layer interposed between the first film and the second film.

In exemplary embodiments, the flexible display unit includes a bending area and a non-bending area adjacent to the bending area. The flexible display can be bent at a side of the flexible display unit. The second film can have a first portion overlapping the bending area and a second portion overlapping the non-bending area, wherein the first portion of the second film has a thickness that is less than that of the first film, and wherein the second portion of the second film has a thickness that is greater than that of the first film. The first and second portions of the second film can be integrally formed.

In exemplary embodiments, the first film has a first portion overlapping the bending area and a second portion overlapping the non-bending area, wherein the first portion of the first film has a thickness that is greater than that of the second film, and the second portion of the first film has a thickness that is less than that of the second film. The flexible window can further comprise a third film positioned over the second film and having a third Young's modulus that is greater than the second Young's modulus; and a second adhesive layer interposed between the second film and the third film.

In exemplary embodiments, the third film has a first portion overlapping the bending area and a second portion overlapping the non-bending area, wherein the first portion of the third film has a thickness that is less than that of the second film, and wherein the second portion of the third film has a thickness that is greater than that of the second film.

In exemplary embodiments, each of the first and second films includes a first portion overlapping the bending area and a second portion overlapping the non-bending area, wherein the first portion of the first film has a thickness that is greater than that of the first portion of the second film, and wherein the second portion of the first film has a thickness that is less than that of the second portion of the second film.

According to at least one embodiment, a flexible display includes the flexible window protecting the flexible display unit realizing the small curvature radius and having a flexibility corresponding to the flexibility of the flexible display unit.

DETAILED DESCRIPTION OF CERTAIN INVENTIVE EMBODIMENTS

Figure 1:
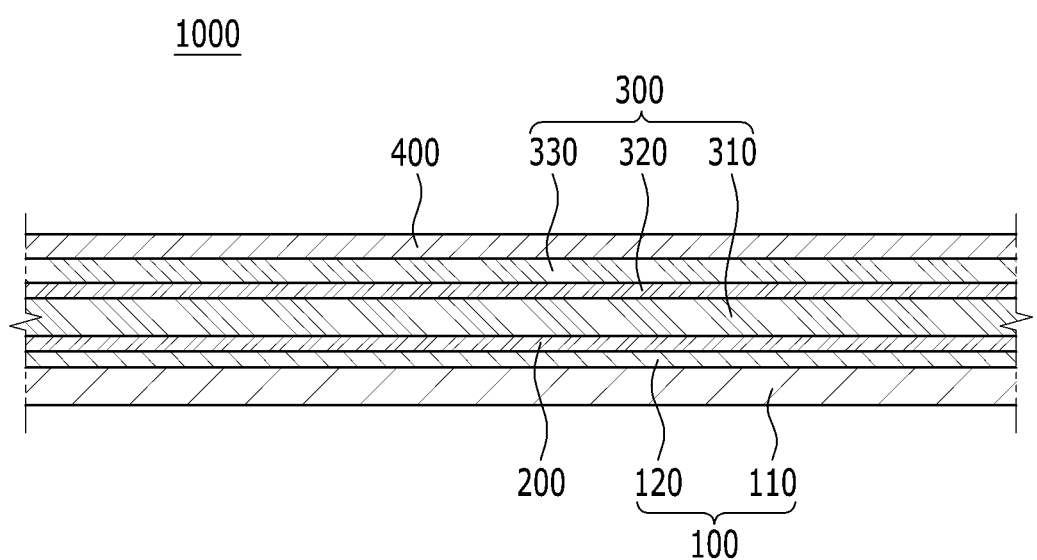
FIG. 1 is a cross-sectional view of a flexible display according to an exemplary embodiment.

The described technology will be described more fully hereinafter with reference to the accompanying drawings, in which exemplary embodiments are shown. As those skilled in the art would realize, the described embodiments may be modified in various different ways, all without departing from the spirit or scope of the described technology.

In describing the described technology, portions that are not related to the description will be omitted. Like reference numerals generally designate like elements throughout the specification.

Further, in exemplary embodiments, since like reference numerals designate like elements having the same configuration, a first exemplary embodiment is representatively described, and in other exemplary embodiments, only configurations different from the first exemplary embodiment will be described.

In addition, the size and thickness of each element shown in the drawings may be exaggerated for the sake of clarity and ease of description, but the described technology is not limited thereto.

In the drawings, the thickness of layers, films, panels, regions, etc., may be exaggerated for the sake of clarity. In the drawings, for better understanding and ease of description, the thicknesses of some layers and areas may be exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, in the specification, the word "~on" generally refers to the positioning above or below the object portion, but is not limited to positioning on the upper side of the object portion based on the direction of gravity.

A flexible display according to an exemplary embodiment will be described with reference to FIG. 1 to FIG. 4.

FIG. 1 is a cross-sectional view of a flexible display according to an exemplary embodiment.

As shown in FIG. 1, the flexible display 1000 includes a flexible display unit 100, an adhesive layer 200, a flexible window 300, and a window coating layer 400.

The flexible display unit 100 can be embodied as a flexible, stretchable, foldable, bendable, or rollable active matrix organic light-emitting diode (AMOLED) display. In exemplary embodiments, the flexible display unit 100 has a high flexibility and can be bent to have a small curvature radius of about 2 mm to about 5 mm.

The flexible display unit 100 includes a display main body unit 110 and an optical film 120.

In some embodiments, the display main body unit 110 comprises a plurality of OLEDs and the optical film 120 includes a phase retardation film, a polarizer, etc. In other embodiments, the flexible display unit 100 does not include the optical film 120.

In some embodiments, the flexible display unit 100 comprises the OLEDs, however it is not limited thereto, and the flexible display unit according to other exemplary embodiments includes one of various display devices such as a liquid crystal display (LCD), a plasma display (PD), a field emission display (FED), an electrophoretic display (EPD), and an electrowetting display (EWD).

The adhesive layer 200 includes an optically clear adhesive (OCA) or a pressure sensitive adhesive (PSA) and is interposed between the flexible display unit 100 and the flexible window 300 so as to adhere the flexible display unit 100 to the flexible window 300.

The flexible window 300 is positioned on the flexible display unit 100 and is adhered to the flexible display unit 100 by the adhesive layer 200, thereby protecting the flexible display unit 100 from interference and the environment. The flexible window 300 includes a first film 310, a first adhesive layer 320, and a second film 330.

The first film 310 is positioned on the flexible display unit 100 and has a thickness that is greater than that of the second film 330. The first film 310 includes a polymer material such as polyethylene terephthalate (PET), polycarbonate (PC), polyimide (PI), and polymethylmethacrylate (PMMA), and for example, may include polyimide (PI). The first film 310 has a first Young's modulus that is less than the Young's modulus of the second film 330 (hereinafter referred to as a second Young's modulus).

The first adhesive layer 320 is positioned between the first film 310 and the second film 330 and may include the optically clear adhesive (OCA) or the pressure sensitive adhesive (PSA). The first adhesive layer 320 adheres the first film 310 to the second film 330.

The second film 330 is positioned on the first film 310 with the first adhesive layer 320 interposed therebetween and has a thickness that is less than that of the first film 310. The second film 330 includes the polymer material such as polyethylene terephthalate (PET), polycarbonate (PC), polyimide (PI), and polymethylmethacrylate (PMMA), and for example, may include PET. The second film 330 has the second Young's modulus that is greater than the first Young's modulus of the first film 310.

The window coating layer 400 is coated on the surface of the second film 330 and is formed of a functional coating layer. The window coating layer 400 may include at least one of the following materials: a hard coating, an anti-finger coating (AF), an anti-reflection coating (AR), and an anti-glare coating (AG).

Next, an effect of the flexible display according to an exemplary embodiment will be described with reference to FIG. 2 to FIG. 4.

Figure 2:
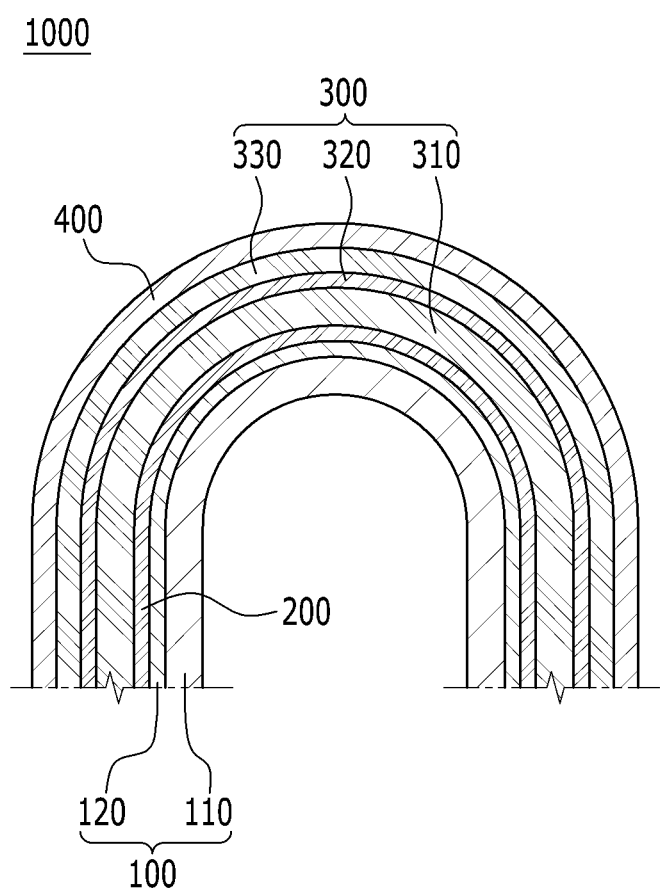
FIG. 2 is a cross-sectional view which illustrates an effect of a flexible display according to an exemplary embodiment.

FIG. 2 is a cross-sectional view which illustrates an effect of a flexible display according to an exemplary embodiment.

As shown in FIG. 2, in the flexible display 1000 according to an exemplary embodiment, when the flexible window 300 is bent to have the small curvature radius of about 2 mm to about 5 mm, the flexible display unit 1000 is also bent to have the small curvature radius of about 2 mm to about 5 mm like the flexible display unit 100. In this embodiment, the first film 310 and the second film 330 of the flexible window 300 are adhered to each other via the first adhesive layer 320, the second film 330 has the second Young's modulus which is greater than the first Young's modulus of the first film 310, and the second film 330 has a thickness that is greater than that of the first film 310. Accordingly, the flexible window 300 is prevented from being damaged by tensile stress applied to the flexible window 300 due to the bending of the flexible display 1000.

Next, the prevention of the described flexible window 300 from being damaged will be described with reference to FIG. 3 and FIG. 4.

Figure 3:
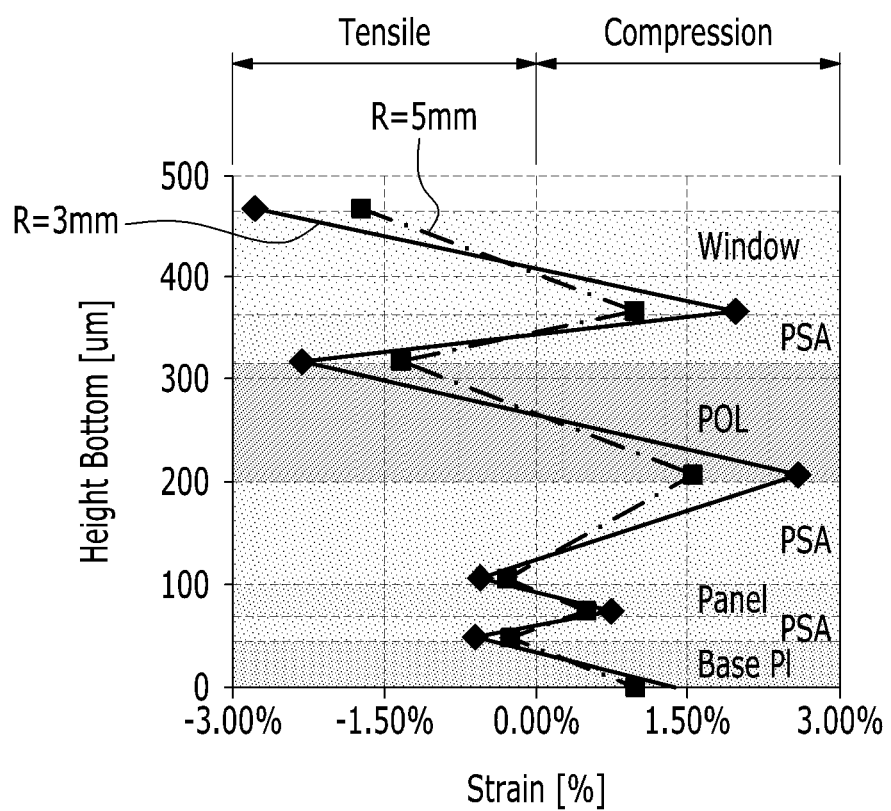
FIG. 3 is a graph which illustrates an effect of a flexible display according to an exemplary embodiment.

FIG. 3 is a graph which illustrates an effect of a flexible display according to an exemplary embodiment.

FIG. 3 is a graph showing the types of stress applied to each layer of the flexible display and the degree of deformation when the flexible display including the polyimide layer (Base PI), a panel (Panel), a polarizer (Pol), and a window (Window) sequentially deposited with an adhesive layer (PSA) between each of the layers. Each of the layers of the flexible display is bent to have the curvature radius of about 3 mm to about 5 mm. In FIG. 3, the line positioned at the outside (the solid line) illustrates the case when the curvature radius is about 3 mm and the line positioned at the inside (the broken line) illustrates the case when the curvature radius is about 5 mm.

As shown in FIG. 3, it was confirmed that each layer functions as an independent layer when a plurality of layers are adhered via the adhesive layer (PSA). The bending stiffness of the window is lower when a plurality of layers are adhered together and formed to have the same thickness as the window formed of one layer than the window formed of one layer since the bending stiffness is proportional to the cube of the thickness. Accordingly, in the flexible window 300 of the flexible display 1000 according to at least one exemplary embodiment, by adhering the first film 310 and the second film 330 via the first adhesive layer 320, the flexible window 300 is prevented from being damaged by the tensile stress applied to the flexible window 300 due to the bending of the flexible display 1000.

Also, as shown in FIG. 3, it was confirmed that tensile stress is applied to an upper portion of the window positioned at an uppermost layer from the panel (Panel) and compression stress is applied to a lower portion.

Next, in the flexible window 300 of the flexible display 1000 according to an exemplary embodiment, the second film 330 positioned at the uppermost layer of the flexible window 300 has a thickness which is less than that the first film 310 and simultaneously has the second Young's modulus which is greater than the first Young's modulus of the first film 310. Accordingly, the second film 330 is prevented from being damaged by the tensile stress applied to the flexible window 300 due to the bending of the flexible display 1000 such that the flexible window 300 is suppressed from being damaged itself.

Figure 4:
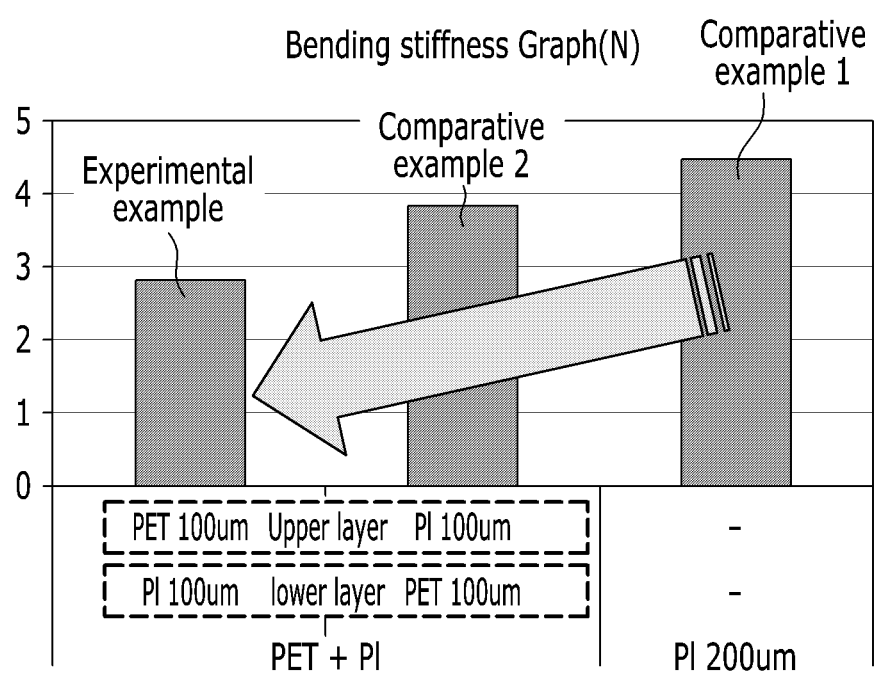
FIG. 4 is a graph which illustrates an effect of a flexible display according to an exemplary embodiment.

FIG. 4 illustrates the results of an experiment which was performed to confirm that the bending stiffness depends on the difference of each Young's modulus of the first film 310 and the second film 330.

FIG. 4 is a graph which illustrates an effect of a flexible display according to an exemplary embodiment.

As shown in FIG. 4, it was confirmed that the bending stiffness of an experimental example with the flexible window 300 formed of a plurality of layers of polyethylene terephthalate (PET, 100 μm)/polyimide (PI, 100 μm) including the upper layer of polyethylene terephthalate having a Young's modulus that was greater than that of polyimide has a lower bending stiffness compared to a comparative example 1 (PI, 200 μm) including a single layer of polyimide (PI) and a comparative example 2 formed of a plurality of layers of polyimide (PI 100 μm)/polyethylene terephthalate (PET, 100 μm). The experimental example included an upper layer formed of PET having a thickness of 100 μm and a lower layer formed of PI having a thickness of 100 μm. The comparative example 1 included a single PI layer having a thickness of 200 μm. The comparative example 2 included an upper layer formed of PI having a thickness of 100 μm and a lower layer formed of PET having a thickness of 100 μm.

As described above, in the flexible window 300 of the flexible display 1000 according to an exemplary embodiment, the first film 310 and the second film 330 are adhered to each other via the first adhesive layer 320, the second film 330 has the second Young's modulus that is greater than the first Young's modulus of the first film 310, and the second film 330 has a thickness that is less than that of the first film 310 such that the bending stiffness of the flexible window 300 is relatively low, thereby preventing the flexible window 300 from being damaged by the tensile stress applied to the flexible window 300 due to the bending of the flexible display 1000.

That is, according to at least one embodiment the flexible display 1000 includes the flexible window 300 protecting the flexible display unit 100 in order to realize a relatively small curvature radius and while having a flexibility corresponding to the flexibility of the flexible display unit 100.

Next, the flexible display according to another exemplary embodiment will be described with reference to FIG. 5.

Hereinafter, only the differences from the above-described flexible display of FIGS. 1 and 2 will be described.

Figure 5:
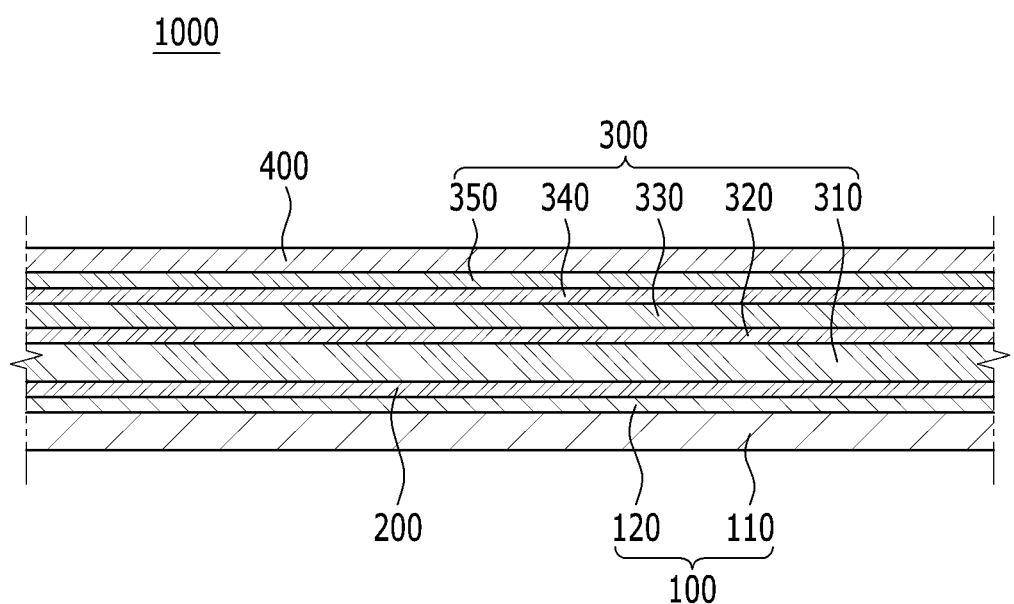
FIG. 5 is a cross-sectional view of a flexible display according to another exemplary embodiment.

FIG. 5 is a cross-sectional view of a flexible display according to another exemplary embodiment.

The flexible window 300 includes the first film 310, the first adhesive layer 320, the second film 330, a second adhesive layer 340, and a third film 350.

The second adhesive layer 340 is positioned between the second film 330 and the third film 350 and may include the optically clear adhesive (OCA) or the pressure sensitive adhesive (PSA). The second adhesive layer 340 adheres the second film 330 to the third film 350.

The third film 350 is positioned on the second film 330 via the second adhesive layer 340 and has a thickness that is less than that of the second film 330. The third film 350 includes the polymer material such as polyethylene terephthalate (PET), polycarbonate (PC), polyimide (PI), and polymethylmethacrylate (PMMA), and for example, may include polyethylene terephthalate (PET). The third film 350 has a Young's modulus that is greater than that of the second film 330.

As described above, the flexible window 300 of the flexible display 1000 includes the first film 310 and the second film 330 adhered by the first adhesive layer 320, the second film 330 and the third film 350 adhered by the second adhesive layer 340, the second Young's modulus of the second film 330 being greater than the first Young's modulus of the first film 310, the third Young's modulus of the third film 350 being greater than the second Young's modulus of the second film 330, and the second film 330 having a thickness that is less than that of the first film 310 and the third film 350 having a thickness that is less than that of the second film 330. Accordingly, since the bending stiffness of the flexible window 300 is decreased, the flexible window 300 is prevented from being damaged by the tensile stress applied to the flexible window 300 due to the bending of the flexible display 1000.

That is, according to at least one embodiment, the flexible display 1000 includes the flexible window 300 protecting the flexible display unit 100 in order to realize a relatively small curvature radius and while having a flexibility corresponding to the flexibility of the flexible display unit 100.

Next, a flexible display according to another exemplary embodiment will be described with reference to FIG. 6 and FIG. 7.

Hereinafter, only the differences from the above-described flexible display of FIGS. 1 and 2 will be described.

Figure 6:
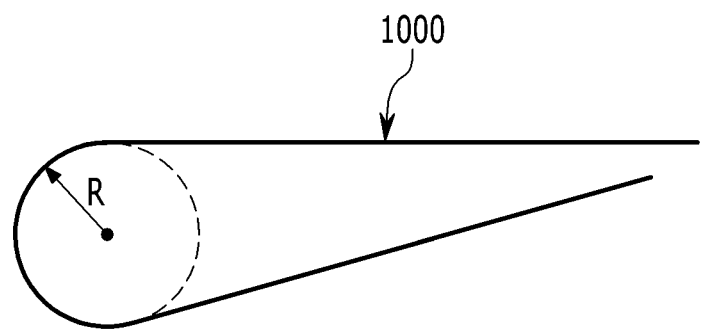
FIG. 6 is a view of a flexible display according to another exemplary embodiment.
Figure 6:
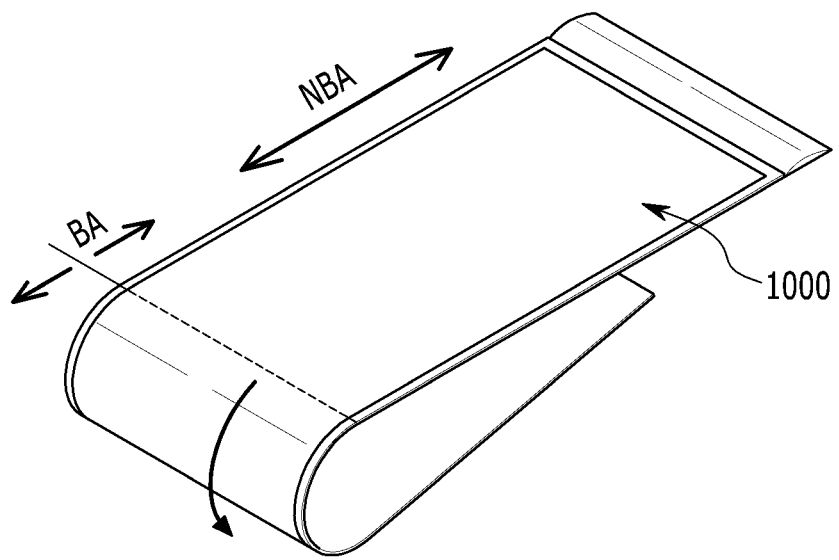

FIG. 6 is a view of a flexible display according to another exemplary embodiment. FIG. 7 is a cross-sectional view of a portion of the flexible display shown in FIG. 6.

Figure 7:
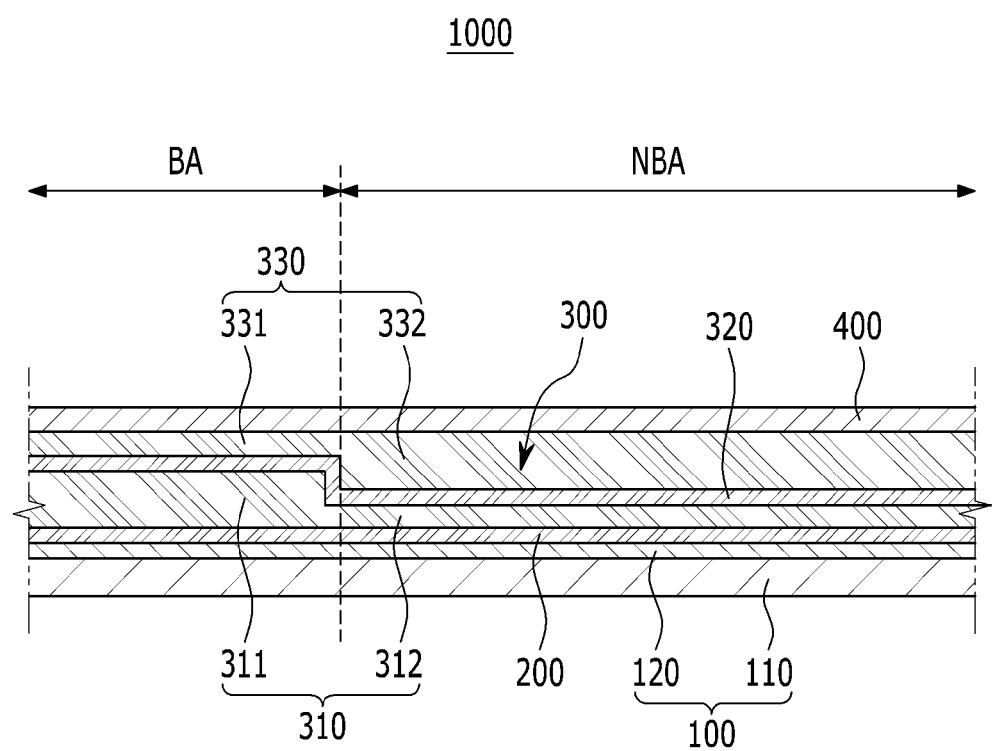
FIG. 7 is a cross-sectional view of a portion of the flexible display shown in FIG. 6.

As shown in FIG. 6 and FIG. 7, the flexible display unit 100 of the flexible display 1000 includes a bending area BA that is bendable and a non-bending area NBA adjacent to the bending area BA. In some embodiments, the bending area BA of the flexible display unit 100 is an area that can be received and slid into a case when bent and the non-bending area NBA is an area that is exposed to the exterior of the case and continuously displays images. In further embodiments, the bending area BA of the flexible display unit 100 is rolled by a roller to be received inside the case. In yet further embodiments, flexible display 1000 is bent at a side of the flexible display unit 100.

The first film 310 includes a first portion 311 and a second portion 312 that are integrally formed with reference to between the bending area BA and the non-bending area NBA.

The second film 330 includes a third portion 331 and a fourth portion 332 that are integrally formed with reference to between the bending area BA and the non-bending area NBA.

The first portion 311 of the first film 310 overlaps the bending area BA and has a thickness that is greater than that of the third portion 331 of the second film 330. The second portion 312 of the first film 310 overlaps the non-bending area NBA and has a thickness that is less than that of the fourth portion 332 of the second film 330. In some embodiments, the first portion 311 of the first film 310 has a thickness that is greater than that of each of the third and fourth portions 331 and 332 of the second film 330. In some embodiments, the second portion 312 of the first film 310 has a thickness that is less than that of each of the third and fourth portions 331 and 332 of the second film 330.

Also, the third portion 331 of the second film 330 overlaps the bending area BA and has a thickness that is less than that of the first portion 311 of the first film 310. The fourth portion 332 of the second film 330 overlaps the non-bending area NBA and has a thickness that is greater than that of the second portion 312 of the first film 310. In some embodiments, the third portion 331 of the second film 330 has a thickness that is less than that of each of the first and second portions 311 and 312 of the first film 310. In some embodiments, the fourth portion 332 of the second film 330 has a thickness that is greater than that of each of the first and second portions 311 and 312 of the first film 310.

In the flexible window 300 of the flexible display 1000 according to the embodiment of FIG. 7, since the first film 310 and the second film 330 are adhered by the first adhesive layer 320, the second film 330 has the second Young's modulus that is greater than the first Young's modulus of the first film 310, and the third portion 331 of the second film 330 overlapping the bending area BA has a thickness that is less than that of the first portion 311 of the first film 310, the bending stiffness of the area of the flexible window 300 overlapping the bending area BA is decreased such that the flexible window 300 is suppressed from being damaged by the tensile stress applied to the flexible window 300 due to the bending of the flexible display 1000.

Also, in the flexible window 300 of the flexible display 1000, although the second film 330 has the second Young's modulus that is greater than the first Young's modulus of the first film 310, since the fourth portion 332 of the second film 330 overlapping the non-bending area NBA has a thickness that is greater than that of the second portion 312 of the first film 310, the bending stiffness of the area of the flexible window 300 overlapping the non-bending area NBA is increased such that the durability of the non-bending area of the flexible window 300 is improved.

That is, according to at least one embodiment, the flexible display 1000 includes the flexible window 300 simultaneously including the area corresponding to the bending area BA in which the bending stiffness is decreased and the area corresponding to the non-bending area NBA in which the bending stiffness is increased.

Next, a flexible display according to another exemplary embodiment will be described with reference to FIG. 8.

Hereinafter, only differences from the flexible display according to the exemplary embodiment of FIG. 7 will be described.

Figure 8:
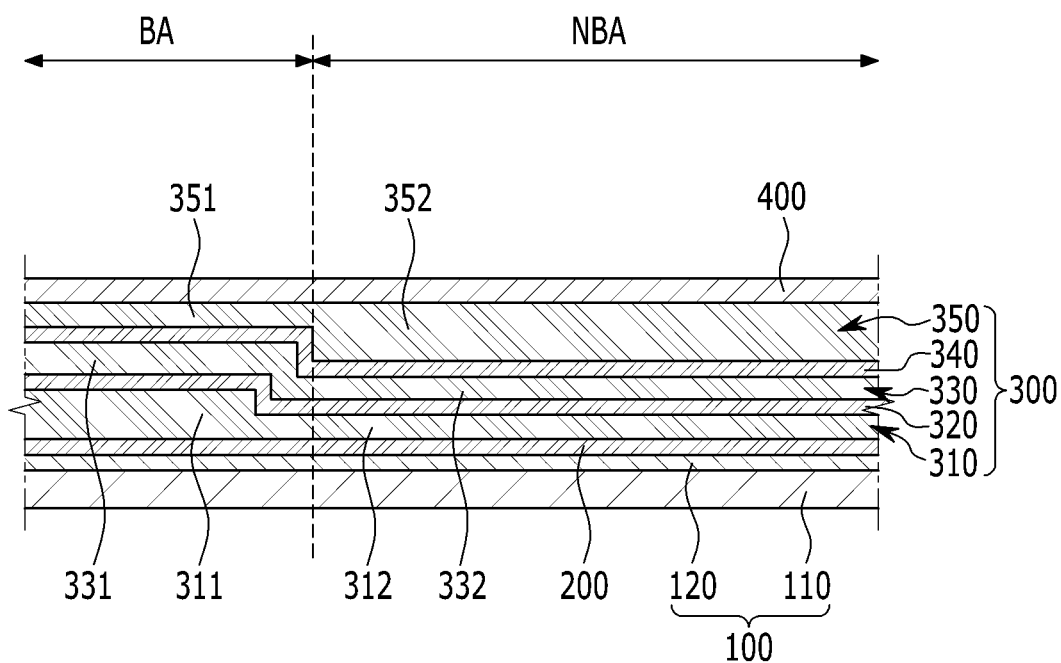
FIG. 8 is a cross-sectional view of a portion of a flexible display according to another exemplary embodiment.

FIG. 8 is a partial cross-sectional view of a flexible display according to another exemplary embodiment.

The flexible window 300 includes the first film 310, the first adhesive layer 320, the second film 330, the second adhesive layer 340, and the third film 350.

The second adhesive layer 340 is positioned between the second film 330 and the third film 350 and may include the optically clear adhesive (OCA) or the pressure sensitive adhesive (PSA). The second adhesive layer 340 adheres the second film 330 to the third film 350.

The third film 350 is positioned on the second film 330 via the second adhesive layer 340 and has a thickness that is less than that of the second film 330. The third film 350 may include the polymer material such as polyethylene terephthalate (PET), polycarbonate (PC), polyimide (PI), and polymethylmethacrylate (PMMA), and for example, may include polyethylene terephthalate (PET). The third film 350 has the third Young's modulus that is greater than the second Young's modulus of the second film 330.

The flexible display unit 100 of the flexible display 1000 includes the bending area BA that is bent and the non-bending area NBA adjacent to the bending area BA. In some embodiments, the bending area BA of the flexible display unit 100 is an area that can be received and slid into a case when bent and the non-bending area NBA is an area that is exposed to the exterior of the case and continuously displays images. In further embodiments, the bending area BA of the flexible display unit 100 is rolled by a roller to be received inside the case. In yet further embodiments, the flexible display 1000 is bent at a side of the flexible display unit 100.

The first film 310 includes a first portion 311 and a second portion 312 that are integrally formed with reference to between the bending area BA and the non-bending area NBA.

The second film 330 includes a third portion 331 and a fourth portion 332 that are integrally formed with reference to between the bending area BA and the non-bending area NBA.

The third film 350 includes a fifth portion 351 and a sixth portion 352 that are integrally formed with reference to between the bending area BA and the non-bending area NBA.

The first portion 311 of the first film 310 overlaps the bending area BA and has a thickness that is greater than that of the third portion 331 of the second film 330. The second portion 312 of the first film 310 overlaps the non-bending area NBA and has a thickness that is less than that of the fourth portion 332 of the second film 330.

Also, the third portion 331 of the second film 330 overlaps the bending area BA and has a thickness that is less than that of the first portion 311 of the first film 310. The fourth portion 332 of the second film 330 overlaps the non-bending area NBA and has a thickness that is greater than that of the second portion 312 of the first film 310.

Further, the fifth portion 351 of the third film 350 overlaps the bending area BA and has a thickness that is less than that of the third portion 331 of the second film 330. The sixth portion 352 of the third film 350 overlaps the non-bending area NBA and has a thickness that is greater than that of the fourth portion 332 of the second film 330. In some embodiments, the fifth portion 351 of the third film 350 has a thickness that is less than that of each of the third and fourth portions 331 and 332 of the second film 330. In some embodiments, the sixth portion 352 of the third film 350 has a thickness that is greater than that of each of the third and fourth portions 331 and 332 of the second film 330.

In the flexible window 300 of the flexible display 1000 according to the FIG. 8 embodiment, since the first film 310, the second film 330, and the third film 350 are respectively adhered by the first adhesive layer 320 and the second adhesive layer 340, the second film 330 has the second Young's modulus that is greater than the first Young's modulus of the first film 310, the third film 350 has the third Young's modulus that is greater than the second Young's modulus of the second film 330, the third portion 331 of the second film 330 overlapping the bending area BA has a thickness that is less than that of the first portion 311 of the first film 310, and simultaneously the fifth portion 351 of the third film 350 has a thickness that is less than that of the third portion 331 of the second film 330, the bending stiffness of the area of the flexible window 300 overlapping the bending area BA is decreased such that the flexible window 300 is prevented from being damaged by tensile stress applied to the flexible window 300 due to the bending of the flexible display 1000.

Also, in the flexible window 300 of the flexible display 1000, since the second film 330 has the second Young's modulus that is greater than the first Young's modulus of the first film 310 and the third film 350 has the third Young's modulus that is greater than the second Young's modulus of the second film 330, the fourth portion 332 of the second film 330 overlapping the non-bending area NBA has a thickness that is greater than that of the second portion 312 of the first film 310, and simultaneously the sixth portion 352 of the third film 350 has a thickness that is greater than that of the fourth portion 332 of the second film 330, the bending stiffness of the area of the flexible window 300 overlapping the non-bending area NBA is increased such that the durability of the non-bending area NBA of the flexible window 300 is improved.

That is, according to at least one embodiments the flexible display 1000 includes the flexible window 300 simultaneously including the area corresponding to the bending area BA in which the bending stiffness is decreased and the area corresponding to the non-bending area NBA in which the bending stiffness is increased.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A flexible display, comprising:
   a flexible display unit comprising a bending area and a non-bending area adjacent to the bending area; and
   a flexible window formed over the flexible display unit and comprising:
   a first film having a first Young's modulus;
   a second film positioned over the first film and having a second Young's modulus that is greater than the first Young's modulus;
   a third film positioned over the second film and having a third Young's modulus that is greater than the second Young's modulus;
   a first adhesive layer interposed between the first film and the second film; and
   a second adhesive layer interposed between the second film and the third film,
   wherein the first film has a first portion overlapping the bending area, the second film has a third portion overlapping the bending area and a fourth portion overlapping the non-bending area, and the third film has a fifth portion overlapping the bending area and a sixth portion overlapping the non-bending area,
   wherein the third portion of the second film has a thickness that is less than that of the first portion of the first film,
   wherein the fifth portion of the third film has a thickness that is less than that of the third portion of the second film, and wherein the sixth portion of the third film has a thickness that is greater than that of the fourth portion of the second film.

2. The flexible display of claim 1, wherein the flexible display is bent at a side of the flexible display unit.

3. The flexible display of claim 1, wherein the first film comprises a second portion overlapping the non-bending area, and the fourth portion of the second film has a thickness that is greater than that of the second portion of the first film.

4. The flexible display of claim 3, wherein the third and fourth portions of the second film are integrally formed.

5. The flexible display of claim 3, wherein the first and second portions of the first film are integrally formed, and wherein the fifth and sixth portions of the third film are integrally formed.

6. A flexible window having a bending area and a non-bending area adjacent to the bending area, comprising:
a first film having a first Young's modulus;
a second film positioned over the first film and having a second Young's modulus that is greater than the first Young's modulus;
a third film positioned over the second film and having a third Young's modulus that is greater than the second Young's modulus;
a first adhesive layer interposed between the first film and the second film; and
a second adhesive layer interposed between the second film and the third film,
wherein the first film has a first portion overlapping the bending area, the second film has a third portion overlapping the bending area and a fourth portion overlapping the non-bending area, and the third film has a fifth portion overlapping the bending area and a sixth portion overlapping the non-bending area,
wherein the third portion of the second film has a thickness that is less than that of the first portion of the first film,
wherein the fifth portion of the third film has a thickness that is less than that of the third portion of the second film, and
wherein the sixth portion of the third film has a thickness that is greater than that of the fourth portion of the second film.

7. The flexible window of claim 6, wherein the first film further comprises a second portion overlapping the non-bending area, and the fourth portion of the second film has a thickness that is greater than that of the second portion of the first film.

8. The flexible window of claim 7, wherein the third and fourth portions of the second film are integrally formed.

9. The flexible window of claim 7, wherein the first and second portions of the first film are integrally formed, and wherein the fifth and sixth portions of the third film are integrally formed.

* * * * *